(12) United States Patent
Thomas

(10) Patent No.: US 9,750,268 B1
(45) Date of Patent: Sep. 5, 2017

(54) GRAIN BULK DENSIFYING DIE APPARATUS AND METHOD

(71) Applicant: NATIONWIDE 5, LLC, Cozad, NE (US)

(72) Inventor: Michael Ray Thomas, St. Clair, MO (US)

(73) Assignee: NATIONWIDE 5, LLC, Ord, NE (US)

( * ) Notice: Subject to any disclaimer, the term of this patent is extended or adjusted under 35 U.S.C. 154(b) by 0 days.

(21) Appl. No.: 15/132,991

(22) Filed: Apr. 19, 2016

(51) Int. Cl.
| A23K 40/25 | (2016.01) |
| A23L 3/36 | (2006.01) |
| A21C 11/16 | (2006.01) |
| A23J 3/26 | (2006.01) |
| A23K 40/00 | (2016.01) |

(52) U.S. Cl.
CPC .............. *A23K 40/25* (2016.05); *A21C 11/16* (2013.01); *A23J 3/26* (2013.01); *A23K 40/00* (2016.05); *A23L 3/36* (2013.01)

(58) Field of Classification Search
CPC  A23K 40/00; A23K 40/25; A23P 1/12; A23L 1/0076; A23L 1/1805; A23L 3/36; A21C 11/16; A23J 3/26
USPC ........ 425/378.1, 378.2, 379.1, 382 R, 382.2, 425/131.1, 131.5; 426/516, 517, 518, 805
See application file for complete search history.

(56) References Cited

U.S. PATENT DOCUMENTS

| 4,358,468 | A | * | 11/1982 | Dolan | A23J 3/26 |
| | | | | | 425/376.1 |
| 5,776,534 | A | * | 7/1998 | Christensen | A21C 11/163 |
| | | | | | 264/176.1 |
| 5,919,509 | A | * | 7/1999 | Cremers | A21C 3/04 |
| | | | | | 264/176.1 |
| 6,527,532 | B1 | * | 3/2003 | Muller | B27N 3/28 |
| | | | | | 425/378.1 |
| 7,293,974 | B2 | * | 11/2007 | Bortone | A23L 1/0088 |
| | | | | | 425/291 |
| 7,588,789 | B1 | * | 9/2009 | Kearns | A23N 17/005 |
| | | | | | 426/446 |
| 7,611,347 | B1 | * | 11/2009 | Kearns | A23N 17/005 |
| | | | | | 425/205 |
| 8,287,268 | B1 | * | 10/2012 | Thomas | A23P 1/027 |
| | | | | | 425/144 |
| 8,652,555 | B2 | * | 2/2014 | Thomas | A23P 1/027 |
| | | | | | 425/144 |
| 2005/0019467 | A1 | * | 1/2005 | Bortone | A23L 1/0088 |
| | | | | | 426/516 |

(Continued)

*Primary Examiner* — Seyed Masoud Malekzadeh
(74) *Attorney, Agent, or Firm* — Doster Greene, LLC

(57) ABSTRACT

An apparatus and method for processing grain material to generate a consistently high densified grain with a desired length, shape and size. The densified grain processing apparatus comprises a die assembly, a cooling assembly and a break-off assembly. The method includes receiving the grain material by the die assembly and forcing the grain material through an extrusion passageway that evenly distributes the grain material into a plurality of orifices thereby producing a high density shaped grain before the grain material exits the die assembly. A coolant is pumped to a coolant passage by means of an at least one pump and cools the shaped grain by passing the shaped grain through at least one of the cooling tube inside a cooling chamber. The break-off assembly then breaks off a predetermined length of the shaped grain.

4 Claims, 16 Drawing Sheets

(56) References Cited

U.S. PATENT DOCUMENTS

| | | | |
|---|---|---|---|
| 2009/0238920 A1* | 9/2009 | Lewis | A23J 1/005 426/20 |
| 2010/0260882 A1* | 10/2010 | Kearns | A23L 1/0076 425/209 |
| 2012/0260808 A1* | 10/2012 | Thomas | B29C 47/92 99/326 |
| 2013/0040023 A1* | 2/2013 | Thomas | B29C 47/92 426/272 |

* cited by examiner

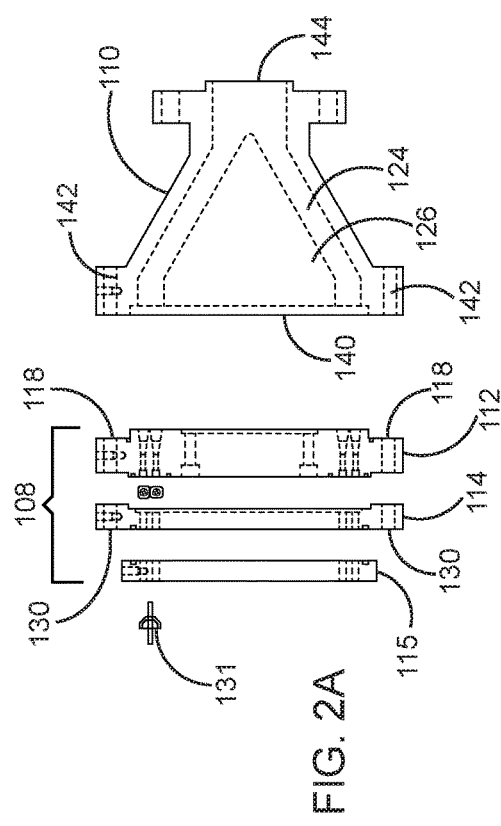
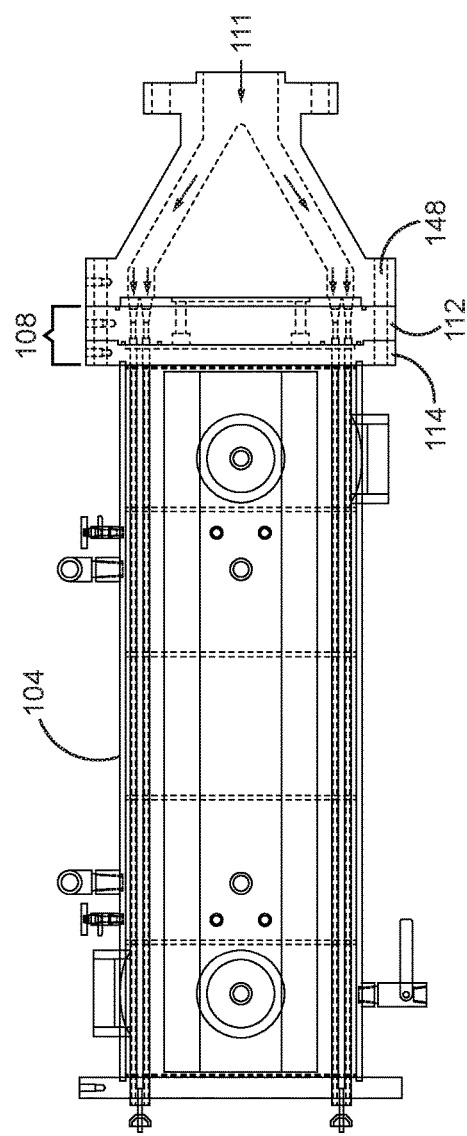
FIG. 2A
FIG. 2B

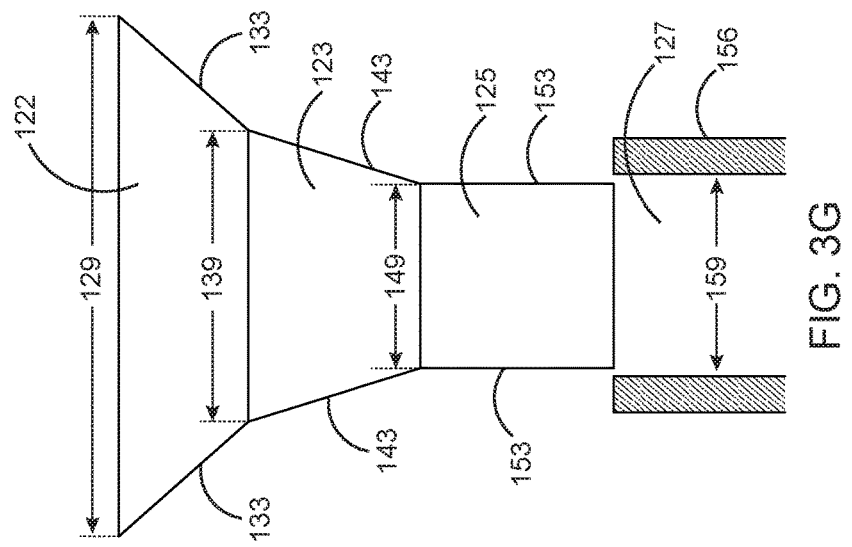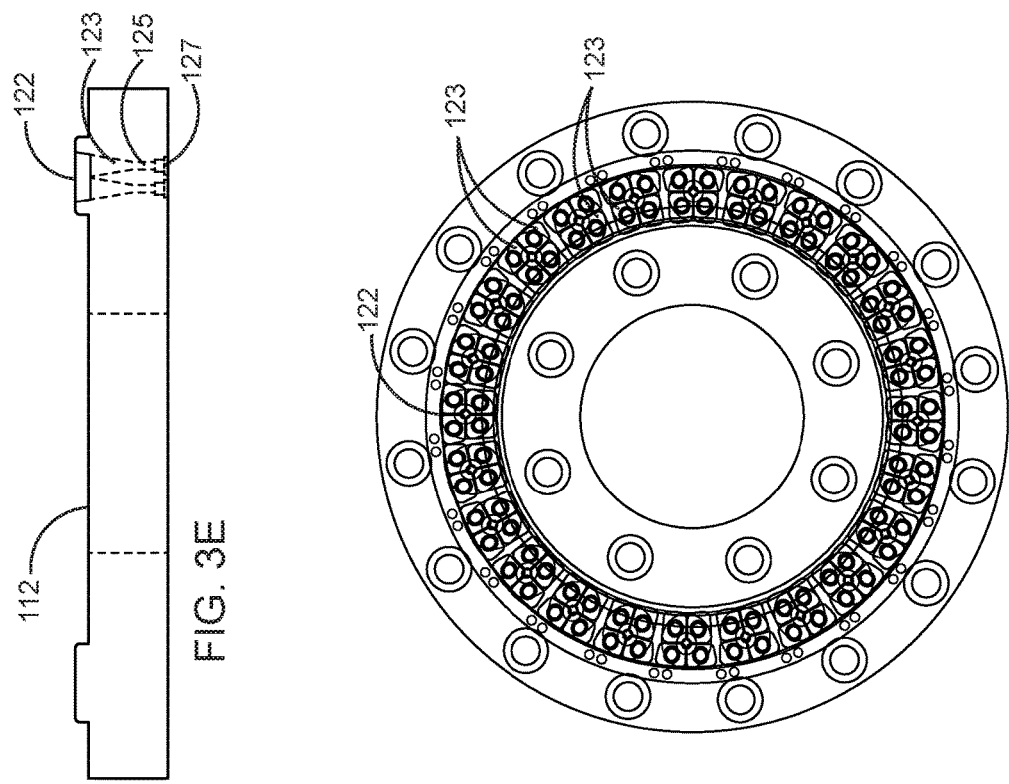

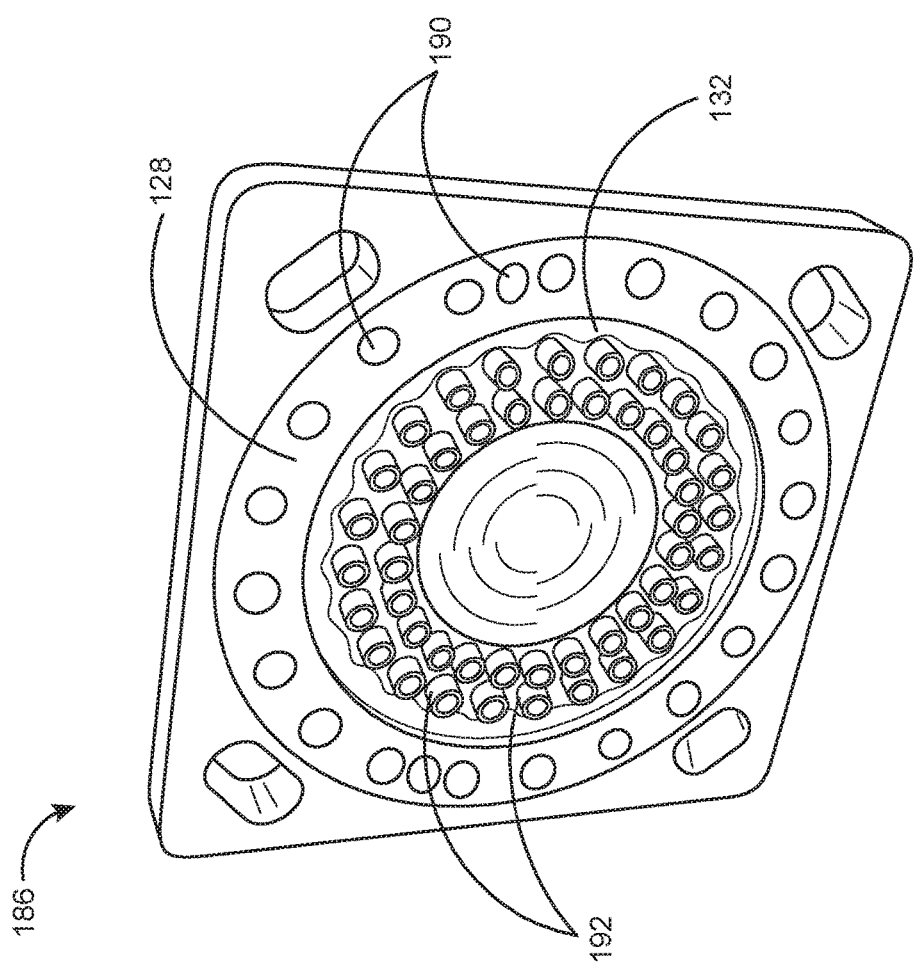

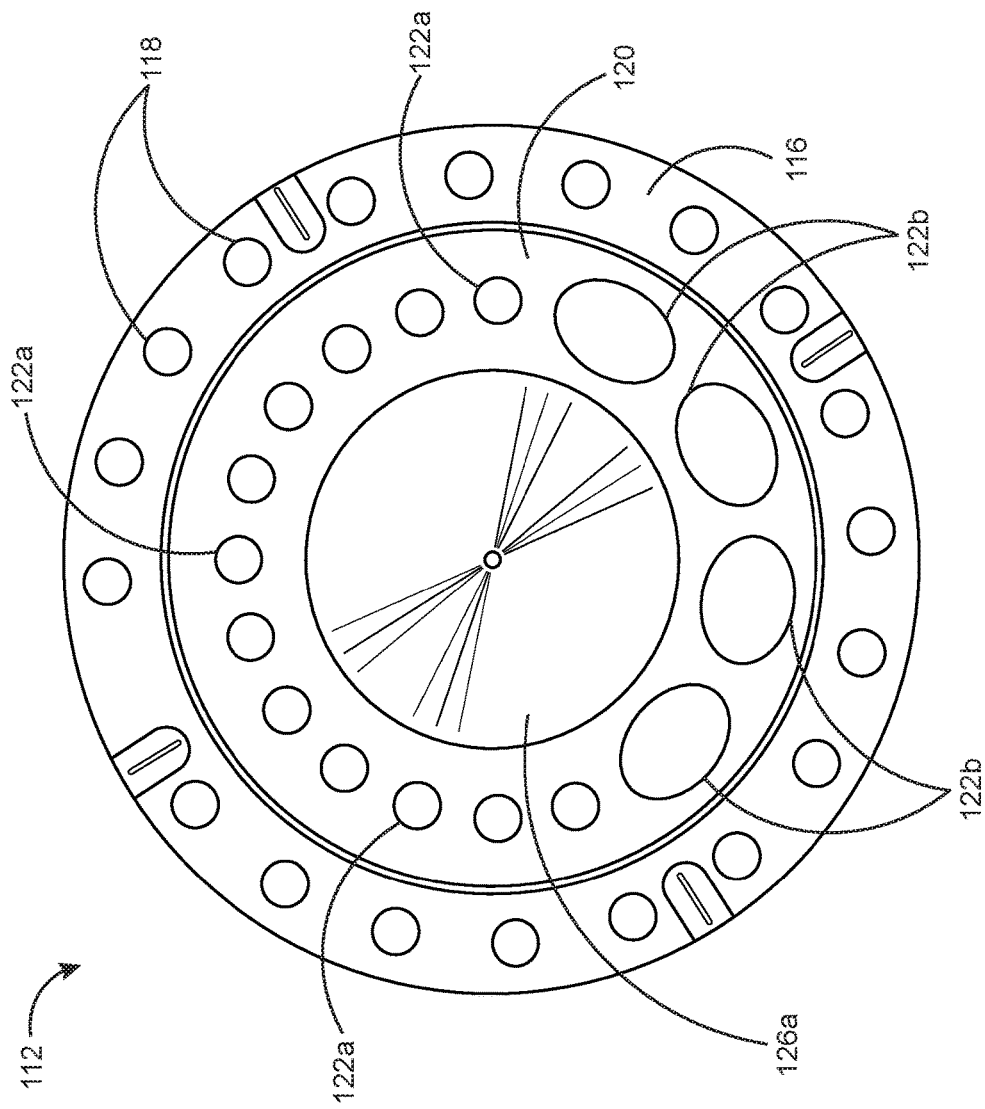

GRAIN BULK DENSIFYING DIE APPARATUS AND METHOD

BACKGROUND OF THE DISCLOSURE

Technical Field of the Disclosure

The present teachings relate to devices and methods for producing a consistently high density material having a desired length and size.

Description of the Related Art

In the field of food and feed processing, grain densifying and die systems are used to produce high quality densified grain for industrial purpose and animal consumption. In general, it has been recognized that construction of the die apparatus, also commonly known as a pellet mill or extruder die, is a critical factor in obtaining desirable pellets as well as high production rates. For example, the thickness of the die, the number of holes in the die, and the surface finish of the die have all been found to affect pellet quality.

In a typical extrusion die apparatus, it is adapted for coupling to the outlet end of an extruder barrel. In operation, the die apparatus is fed the product from the extruder barrel and shapes the product into a final extrudate, which is cut by a rotating knife to form pellets having predetermined lengths.

However, some existing processes fail to remove all the moisture or air or both from the final pellet, which subjects the pellets to increased decomposition and breakdown during normal handling, storage, and transport. This decreases the percentage of useful pellets.

In conventional pelleting techniques or extrusion techniques, steam is required to be added to the raw material during product densification. While steam is being added to the raw material, air is also continuously introduced into the raw material causing the material to contain substantially more air and water, which adversely affects the ultimate density. The more air and water contained in the material, the less dense the final product becomes after exiting the die. This is due to the fact that the water is not compressible, whereas air is compressible. Therefore, when the final product is subjected to vibrations and jostling, for example, associated with vehicular transport or transport to an accumulation bin, the product may begin to crumble, split or break apart at sites along weak points where the water and air are mixed within the product. These breaking points in the products create fines, which are the materials that result from products, such as pellets, disintegrating, due to poor quality. Fines can be a function of moisture and high friction or oversized feed ingredient particles. Fines are one of the major factors in determining consumer satisfaction with feed quality. To achieve a sufficiently consistent product with this conventional process, it requires more energy to obtain the desired pellet output.

Furthermore, when large diameter or oversized products are produced, they will become even hotter when the raw material mixed with the steam and air is pushed into the final die for forming the shape of the final product. This increased heat causes the water in the product to vaporize into the form of steam which breaks apart the product back to a loose form. One method to mitigate the breaking up of such oversized products is reducing the throughput of raw material through the die, which diminishes the output.

Another method to combat this problem of moisture and air entrapped in the raw material is to add binders, or fillers or both that allow the pellet to bind in a dense form in high heat. The problem with this method is that it drastically reduces the nutritional value of the final product by as much as 60%. The pellet quality can be seriously affected with the addition of too much binder. Lowering the nutritional value increases the cost and negatively affects the final product as a nutritional feed product. The farmer has to feed twice as much tonnage to his animals on a daily basis, which is very costly.

Therefore, there is a need for a method and apparatus for generating pellets with sufficient density for effective transportation, handling and storage practices, without the need for adding additional binders or fillers or both. There is also a need for a method and apparatus that eliminates fines produced in feed products. There is a further need for a method and apparatus that does not require the reduction in throughput of the process to eliminate fines which is the product breaking up during storage or transport.

SUMMARY

The present invention may satisfy one or more of the above-mentioned needs. Other features and/or advantages may become apparent from the description which follows.

An apparatus for producing a densified grain according to various exemplary embodiments can include a die assembly, a die head, a cooling chamber, and a break-off assembly. In various embodiments, the die assembly can include a first annular end, a second end having a die adapter for receiving a grain material, and a substantially triangular nose cone member at a middle portion thereof. The grain material received by the die adapter is forced through an extrusion passageway that evenly distributes the grain material into each of the orifices thereby producing a high density grain material.

In various embodiments, the die head can include at least one plate including a plurality of orifices. Each orifice extends out through the die head such that each orifice defines a plurality of die passageways within the die head for the grain material to pass there through. The die head is mounted to the die body with at least one first fastening mechanisms thereby enclosing the substantially triangular nose cone configured as a flow-direction mechanism to provide an extrusion passageway for the grain material. The grain material received by the die adapter is forced through the extrusion passageway that evenly distributes the grain material into each of the orifices thereby forming the grain material into a shaped grain material having a density before the grain material exits the die head.

In various embodiments, each die passageway comprises an inlet surface that tapers downwardly. A plurality of funnel-shaped structures extends from the inlet surface. Each funnel-shaped structure may have a wide inlet and inwardly sloping sides extending downwardly. A constricted passage may extend from the inwardly sloping sides of each funnel-shaped structure. The constructed passage may include a constricted diameter that is smaller than a diameter of a final product of the densified grain, wherein the constricted passage is configured having a linear length sufficient to enable the material to stabilize to the constricted diameter as the material travels therein.

In various embodiments, the relief section may be positioned downstream of the constricted passage. The relief section may include an enlarged diameter that defines the diameter of the final product, and the relief section extends to an outlet of the die head.

In various embodiments, the cooling assembly, which cools the shaped grain material, may include a cooling chamber having a first end, a second end, a first coolant opening, a second coolant opening, and a coolant passage that extends from the first end to the second end. The first and the second coolant openings are configured to receive at least one coolant to the coolant passage.

In some embodiments, the cooling chamber includes a first plate member, a second plate member, and at least one cooling tube. The first plate member can be positioned at the first end and mounted to the die head with the at least one second fastening mechanisms. The second plate member can include a plurality of exit ports positioned at the second end.

In various embodiments, the at least one cooling tube includes an inlet end for receiving the shaped grain material and an outlet end. Each cooling tube can be horizontally placed inside the cooling chamber. Each inlet end of the at least one cooling tube can be connected to the at least one die passageway of the die head, and each outlet end of the at least one cooling tube can be connected to the at least one exit port of the second plate member of the cooling chamber. The cooling chamber cools the shaped grain material by passing the shaped grain material through each of the cooling tubes.

In various embodiments, the break-off assembly can be configured to break off a preselected length of the shaped grain material. In various embodiments, the break-off assembly comprises at least one stud member and at least cone breaker. At least one stud member can be attached to the second plate member at the second end of the cooling chamber. The at least one cone breaker can be threaded to the at least one stud member.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness. The skilled artisan will understand that the drawings described below are for illustrative purposes only. The drawings are not intended to limit the scope of the present teachings in any way.

FIG. 2A is an exploded view of a die assembly embodied with the grain processing apparatus shown in FIG. 1 in accordance with the present teachings;

FIG. 2B illustrates a side view of a die assembly when assembled with a cooling chamber in the grain processing apparatus shown FIG. 1 in accordance with the present teachings;

FIG. 3E illustrates a side view of an exemplary embodiment of a passageway extending through a die assembly in accordance with the present teachings;

FIG. 3F illustrates a top view of an exemplary embodiment of four funnel-shaped members formed within a single orifice in accordance with the present teachings;

FIG. 3G illustrates a side view of an exemplary embodiment of a single orifice extending downward to a single funnel-shaped member that connects to a cooling tube in accordance with the present teachings;

FIG. 4B illustrates a perspective view of an exemplary embodiment of a second plate part of a die head embodied with a die assembly shown in FIG. 2C in accordance with the present teachings;

FIG. 7 illustrates another exemplary embodiment of the break-off assembly shown in FIG. 5 in accordance with the present teachings; and.

FIG. 11 illustrates another exemplary embodiment of a die assembly that may be employed in the grain processing apparatus in accordance with the present teachings.

DETAILED DESCRIPTION OF VARIOUS EMBODIMENTS

Figure 1:
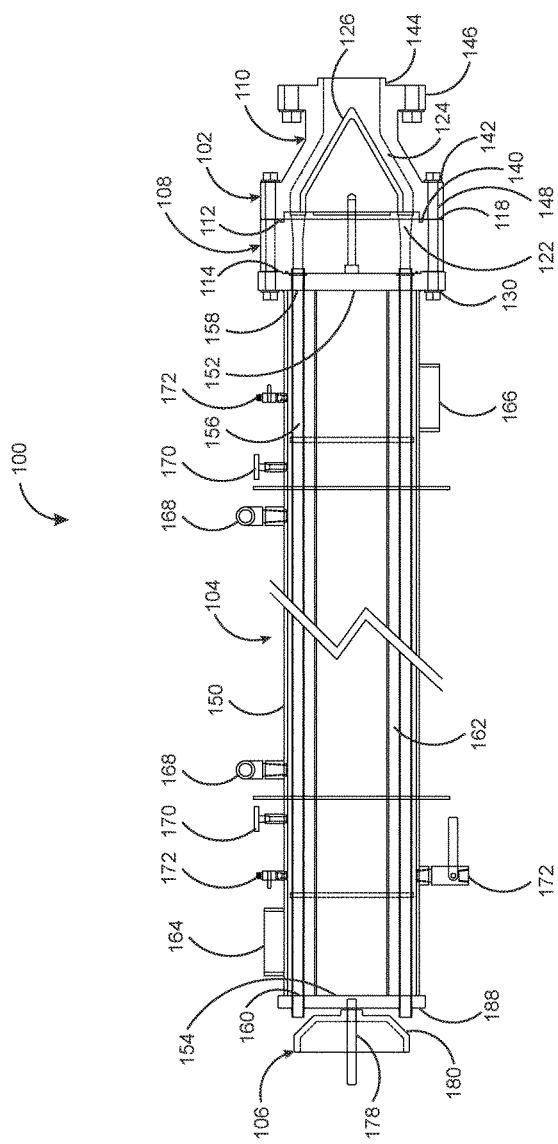
FIG. 1 illustrates a schematic representation of an exemplary embodiment of a grain processing apparatus in accordance with the present teachings.

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternately be described using the language "consisting essentially of" or "consisting of."

For purposes of better understanding the present teachings and in no way limiting the scope of the teachings, it will be clear to one skill in the art that the use of the singular includes the plural unless specifically stated otherwise. Therefore, the terms "a," "an," and "at least one" are used interchangeably in this application Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. In some instances, "about" can be understood to mean a given value ±15%. Therefore, for example, 100 degrees Fahrenheit (° F.) could mean 95-105° F. At the very least, each numerical parameter should at least be construed in light of the number of reported significant digits and by applying ordinary rounding techniques.

Various embodiments provide a method and apparatus for processing densified grain to generate a consistently high densified grain with a desired length, shape and size. Various embodiments of the die apparatus described herein enhance pellet preparations methods for effective transportation, and handling and storage practices. In various embodiments, the operation of the device may be relatively simple and robust, and may enable pellet preparation without additional equipment, expensive retooling or frequent replacement of various components.

Various embodiments relate to a die apparatus and process for making densified grain into a desired shape. Some embodiments may include a die head section, a cooling section, and a break-off section. The die head section may include a die adapter, a die head with nose cone, a plurality of orifices and a plurality of funnel member. In use, the die head section receives the dense hot grain from a bulk densification process under a pressure and splits the dense grain such that it is forced into a plurality of orifices.

In various embodiments, the dense grain passes through a passageway defined by an enlarged inlet of the plurality of orifices and travels through the funnel member where the diameter narrows until it reaches a size where the diameter is smaller than a desired product size. The passageway remains at the reduced size for a linear length in order to allow the product to stabilize at that the reduced size. Then, the size of the passageway increases to a larger diameter, which is the diameter of the final desired product.

A relief surface is provided in the die at a transition area, where the smallest area of the passageway increases to a larger area that defines the final size of the product. The relief in the die allows for the pressure of the process to be maintained upstream of the die head and does not allow for pressure to continue past the relief of the die head. Thus, the relief in the die enables the use of long cooling tubes to allow the process to produce a high volume output. Without the relief in the die, the pressure applied upstream of the die head would also be applied to the cooling tubes. However, the cooling tubes have been designed to be long in length to assure a long residence time of the dense grain to cool the product while advancing through the cooling tubes. If the upstream pressure is applied to the long cooling tubes, then the process would require substantially more energy and pressure to push the product through the length of the cooling tubes. Without the relief in the die, such a configuration would not be practical in some conventional devices and in some cases would be impossible.

In various embodiments, the cooling section comprises a cooling chamber, a cooling passageway, a plurality of cooling tubes, a central chilling system, a temperature gauge, a coolant inlet, a valve bleeder, a valve drain, a coolant outlet and a plurality of pumps. The cooling section receives the hot dense grain from the die head and then cools the product in the plurality of cooling tubes. The cooling passageway is housed such that it surrounds the cooling tubes to create the cooling chamber. The coolant may be re-circulatory pumped through the cooling passageway using a plurality of pumps and managed by a central chilling system. The central chilling system maintains a low coolant temperature such that a substantial amount of heat is removed from the outer surface of the cooling tubes by the cooling medium.

Various embodiments of the break-off section may include a break-off cone and a stud plate. The break-off section receives the dense product, which has been cooled down to a temperature from the cooling tubes of the cooling section so that the product is ready to be cut or broken off to a linear length in size. The break-off cone may be, for example, a conical external funnel shaped cone that is threaded onto a stud plate. In various embodiments, the break-off cone can be adjustable by twisting or rotating the cone in a clockwise or counterclockwise direction to move the cone outwards or away from the exit end of the cooling tubes.

In an exemplary method for obtaining a consistently high densified product having a linear length from the grain, wherein the grain is densified by the grain bulk densification process, the hot densified grain is compressed by applying pressure, and the process includes one or more of the following steps of: receiving the hot grain at the nose of the die head section from the bulk densification process; allowing the dense grain to pass through the plurality of orifices and along the funnel member of the die head section; receiving the hot, dense grain at the plurality of cooling tubes and cooling the dense grain by maintaining a low coolant temperature; removing the heat from the hot dense grain by re-circulating the coolant inside the cooling chamber; and utilizing the break-off cone of the break-off section to cut the cooled dense grain into a desired shape.

FIG. 1 illustrates a schematic view of an exemplary embodiment of a grain processing apparatus 100 for producing a consistently high density grain in accordance with the present teachings. The terms "high density" or "highly densified" are used herein interchangeably to refer to the method and apparatus, according to the present teaching which can bulk densify raw material approximately three times its density in raw loose form. In contrast, conventional methods can bulk densify raw material up to one and a half times its density in raw lose form. Namely, the method and apparatus, according to the present teachings, is capable of obtaining a density greater than conventional systems. One way to overcome the lower mass density and transportation limitations, discussed above, is to densify the material, which converts the raw material into uniform commodity-type products. Densification employs a process such as forcing raw material through a die to form a densified product. Densification increases the bulk density, thereby producing a densified product with improved handling characteristics while reducing storage losses and transportation costs.

In FIG. 1, various embodiments of the grain processing apparatus 100 may include a die assembly 102, a cooling assembly 104, and a break-off assembly 106. During operation, the die assembly 102 functions to receive the hot grain material under pressure from the bulk densification process (not shown). The die assembly 102 then splits the grain material, feeds it into multiple orifices 122, and funnels the grain down through the orifices until it forms a final shape and density. After formation of the final shape, the process passes the grain material to the cooling section as a hot, dense, stable product shape in its final form in terms of diameter or area.

As illustrated in FIGS. 1, 2A and 2B, the die assembly 102 can include a die head 108 and a die body 110. The die assembly 102 may comprise a die head 108 and a die body 110 which connect together by fastening means 148. In some embodiments, the die head 108 and the die body 110 are removably coupled to each other in the die assembly 102. In other embodiments, the die head 108 is integral with the die body 110 in the die assembly 102.

Figure 2C:
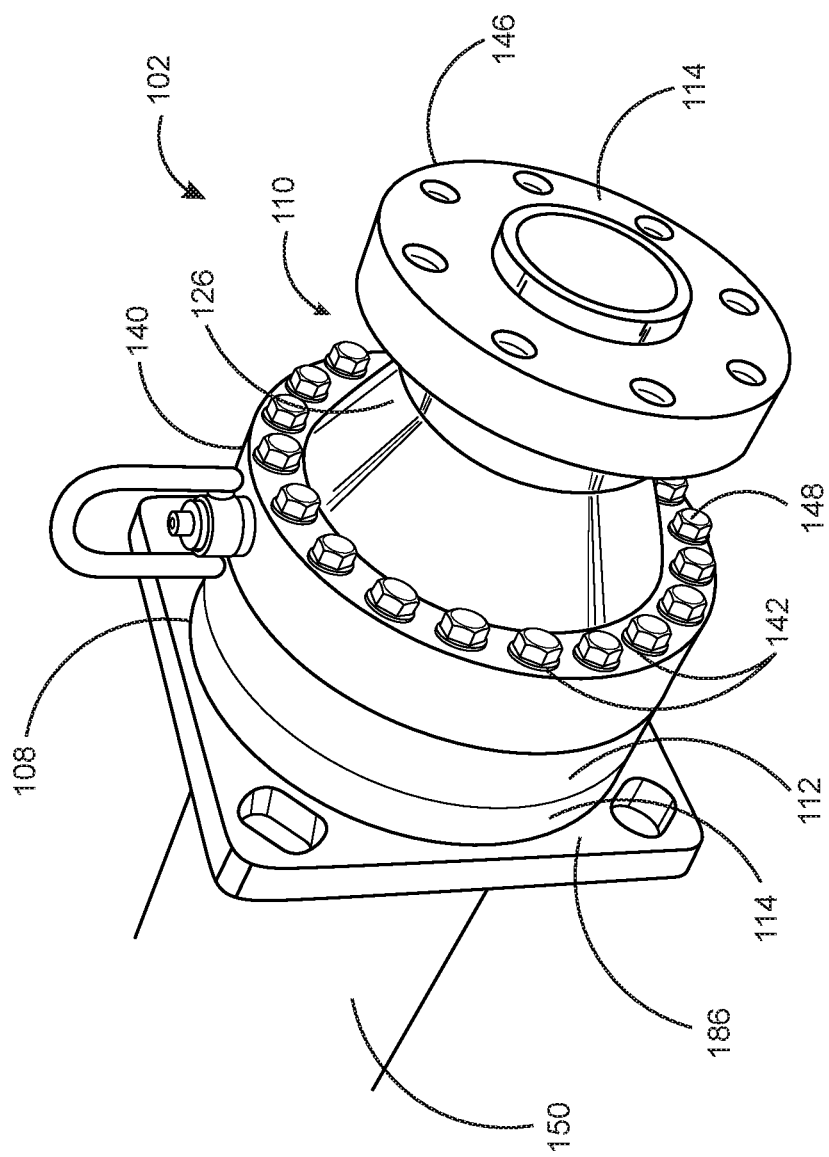
FIG. 2C illustrates a perspective view of an exemplary embodiment of a die assembly embodied with the grain processing apparatus shown in FIG. 1 in accordance with the present teachings.
Figure 3A:
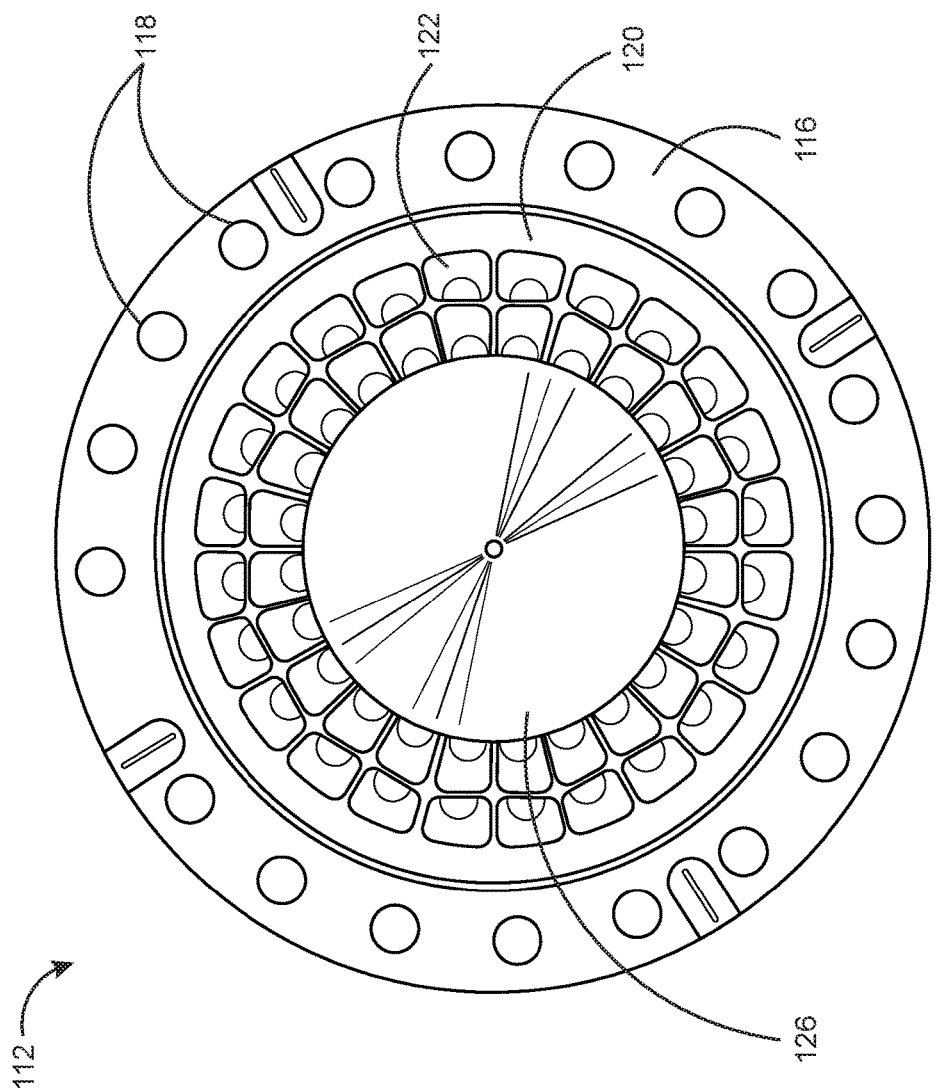
FIG. 3A illustrates a front view of an exemplary embodiment of a first plate part of a die head embodied with the die assembly shown in accordance with the present teachings.

FIG. 2A is an exploded view of the die assembly 102. FIG. 2B illustrates a side view of the die assembly 102 when assembled. FIG. 2C depicts an exemplary embodiment of a perspective view of the die assembly 102 when assembled. The die head 108 may include a first plate part 112, a second plate part 114, and a third plate part 115. The first plate part of the die head 112 may include a first section 116 having a plurality of first set of holes 118 and a second section 120 having a plurality of orifices 122, which are best shown in FIG. 3A. The second plate part of the die head 114 may include a plurality of second set of holes 130. When assembled as shown in FIGS. 1 and 2B, the third plate part 115 at the lower housing body section of the die head 108 section connects to the second plate part 114 by bolts 131 or other fastening means. In lieu of the multiple plates 112, 114, 115, in some embodiments, the die head 108 may be formed integrally as a unitary body. The die head 108 can be made of a robust material, for example, such as 4140 alloy steels, D2 steels, and A-2 tool steel that is capable of receiving a large amount of pressure.

The die body 110, as depicted in FIGS. 1, 2A, and 2B, may include a first annular end 140 having a plurality of third set of holes 142, a second end 144 having a die adapter 146, a substantially triangular nose cone member 126 and an extrusion passageway 124. The die adapter 146 may connect through the use of bolts to an extruder (not shown). The die body 110 can be mounted in a face-to-face engagement with the first plate part of the die head 112 in such a way that the plurality of third set of holes 142, a plurality of first set of holes 118, and a plurality of second set of holes 130 in the second plate part 115 are aligned to each other and connected with at least one fastening means 148 thereby enclosing the substantially triangular nose cone member 126 to provide the extrusion passageway 124 for the densified grain. The substantially triangular nose cone member 126 can be located centrally, extending inwardly and can be configured as a flow-directing mechanism for the densified grain.

In various embodiments, as best shown in FIGS. 3A-3E, the plurality of orifices 122 in the die head 108 can be configured to define a conical or funnel-shaped passage having an enlarged inlet and a narrowed outlet end. In some embodiments, funnel-shaped members 123 may be formed inside the orifices 122. The densified material is forced through the die in the direction of extrusion as shown by the arrow 111 in FIG. 2B.

Figure 3C:
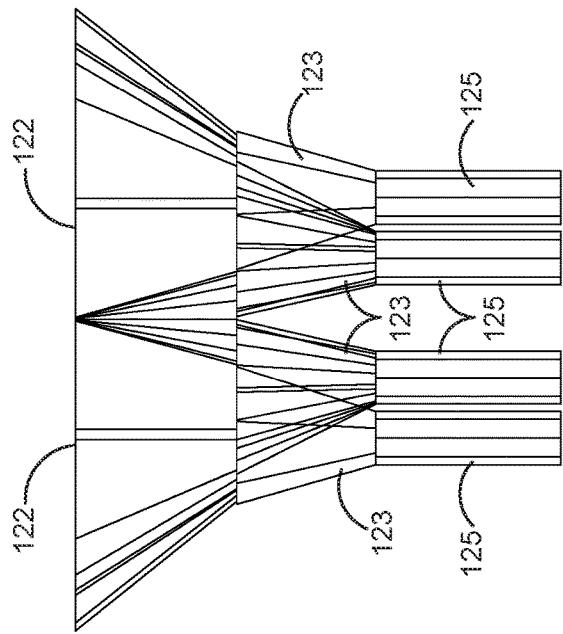
FIG. 3C illustrates a side view of an exemplary embodiment of an orifice tapering inwardly down to multiple funnel-shaped members in accordance with the present teachings.
Figure 3B:
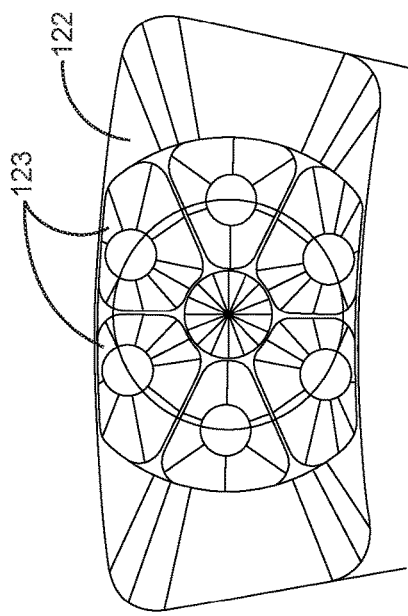
FIG. 3B illustrates a top view of an exemplary embodiment of inlet surfaces of an orifice in accordance with the present teachings.
Figure 3D:
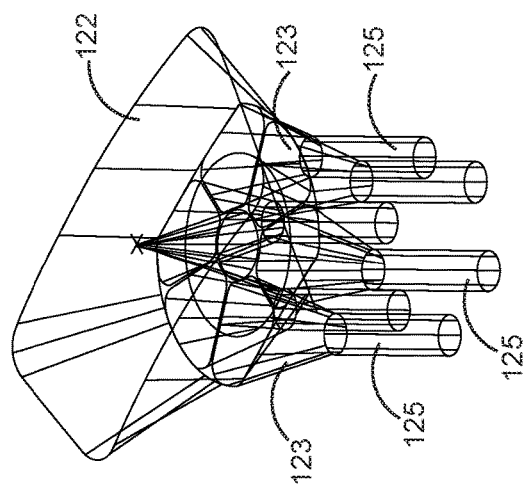
FIG. 3D illustrates a perspective view of an exemplary embodiment of an orifice tapering inwardly down to multiple funnel-shaped members in accordance with the present teachings.

Each exemplary orifice 122 depicted in FIGS. 3A and 3B has an inlet having a substantially rectangular shape. The inlet surfaces of the orifice 122 taper inwardly down to multiple funnel-shaped members 123 (FIGS. 3C and 3D). When the material reaches the funnel-shaped members 123, the material is further divided and forced through the funnel section in the direction of extrusion shown by arrow 111 downward to die tubing 125. The exemplary embodiments of the funnel-shaped members 123 (FIGS. 3C and 3D) have a relatively wide mouth or inlet for receiving the material as it is pushed there through and conical, downwardly sloping side walls. The side walls gradually taper and descend to the die tubing 125.

In the examples shown in FIGS. 3A, 3B and 3D, six funnel-shaped members 123 are formed inside a single orifice 122. FIG. 3F depicts another exemplary embodiment illustrating four funnel-shaped members 123 formed inside a single orifice 122.

FIG. 3G illustrates a side view of an exemplary single orifice 122 extending downward to a single funnel-shaped member 123, which connects to a cooling tube. In FIG. 3G, the single orifice 122 typically has a cross-sectional area having an inlet width or diameter 129 in a range of about 0.84 inches to 1.36 inches or an area in a range of about 0.55 square inches to 1.45 square inches. Similarly, the inlet width or diameter 139 of the funnel-shaped member 123 is configured as a circular area having a diameter in a range of about 0.58 inches to 1.01 inches or an area in a range of about 0.26 square inches to 0.80 square inches. The width or diameter 149 of the die tubing 125 is configured in a generally circular area having a diameter in a range of about of about 0.28 inches to 0.78 inches or an area in a range of about 0.06 square inches to 0.48 square inches. The height 133 from the inlet of the orifice 122 to the inlet of the funnel-shaped member 123 is approximately 0.75 inches to 0.90 inches. The height 143 from the inlet of the funnel-shaped member 123 to the inlet of the die tubing 125 is approximately 0.90 inches to 1.75 inches. The height 153 from the inlet of the die tubing 125 to the inlet of the cooling tube 156 is approximately 2.00 inches. These dimensions are merely examples. For example, "about" can be understood to mean a given value ±15%. The exact dimensions of the funnel-shaped member are variable depending on the specific treated material and/or the application desired.

Figure 10B:
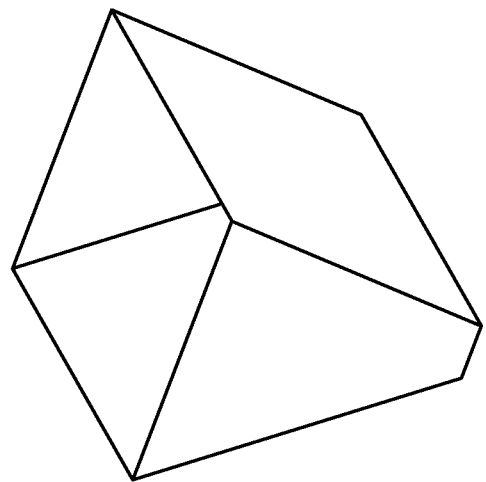
FIG. 10B illustrates an exemplary embodiment of a wedge-shaped funnel that may be employed in the grain processing apparatus in accordance with the present teachings.
Figure 10D:
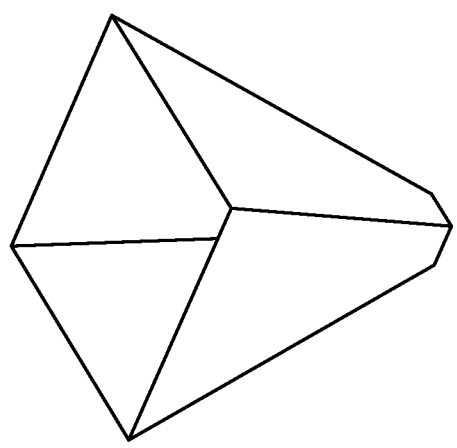
FIG. 10D illustrates an exemplary embodiment of a pyramid shaped funnel that may be employed in the grain processing apparatus in accordance with the present teachings.
Figure 10A:
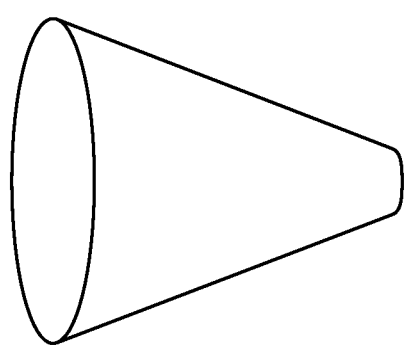
FIG. 10A illustrates an exemplary embodiment of a conical-shaped funnel that may be employed in the grain processing apparatus in accordance with the present teachings.
Figure 10C:
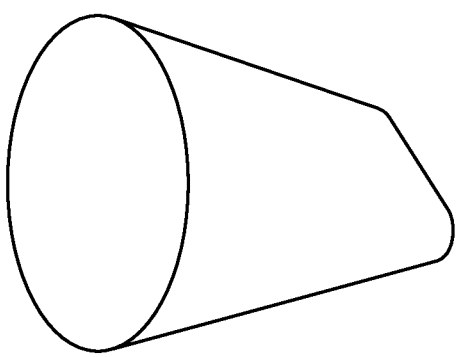
FIG. 10C illustrates an exemplary embodiment of a transition-shaped funnel that may be employed in the grain processing apparatus in accordance with the present teachings.

FIGS. 10A-10D depict exemplary embodiments of various funnel geometries that can be employed within the die head 108. FIG. 10A illustrates a conical-shaped funnel. FIG. 10B depicts a wedge-shaped funnel. FIG. 10C illustrates a transition-shaped funnel. FIG. 10D depicts a pyramid shaped funnel. In some embodiments, the funnel-shaped members may include at least one channel, groove, or projection to promote mixing to ensure the consistency of the material.

As a result of the funnel shape of the orifice, the densified material is compressed laterally and perpendicular due to the forward motion of the material as it advances through the die head 108. The dense grain passes through an enlarged inlet of the plurality of orifices and travels through the funnel member 123 where the diameter narrows until it reaches die tubing 125 extending from the funnel member 123. The die tubing 125 is configured having a diameter which is smaller than a desired product size. The diameter of die tubing 125 remains at the reduced size for a linear length in order to allow the product to stabilize at the reduced size as the product travels therein. As depicted in FIG. 3G, the width or diameter 149 of the die tubing 125 is configured in a generally circular area having a diameter in a range of about of about 0.28 inches to 0.78 inches or an area in a range of about 0.06 square inches to 0.48 square inches.

Then, the diameter of the die tubing 125 increases from the reduced size of the die tubing 125 to a larger diameter at a transition area, which is the diameter of the final desired product. As shown, for example, in FIGS. 3E and 3G, a relief surface 127 is provided in the die at the transition area, where the smallest area of the passageway increases to a larger area that defines the final size of the product. The width or diameter 159 of the die tubing 156 is configured in a generally circular area having a diameter in a range of about of about 0.50 inches to 1.00 inches or an area in a range of about 0.25 square inches to 0.75 square inches.

Thus, as shown in FIGS. 3E and 3G, the passageway extending through the die head 108 is defined by orifices 122, funnel section 123, die tubing 125 and relief surface 127. In FIG. 3G, the total area of reduction from the area of the grain entering the orifices 122 to the area exiting the die tubing 125 is in the range of about 55% to about 75%. The area of reduction between the inlet width or diameter 129 of the orifice 122 and the inlet width or diameter 139 of the funnel-shaped member 123 is approximately 45%. The area of reduction between the inlet width or diameter 139 of the funnel-shaped member 123 and the width or diameter 149 of the die tubing 153 is approximately 40%. From the die tubing 125 to the relief 127, an area of increase of approximately 25% occurs.

The relief surface 127 extends downstream of the die tubing 125 and flares outward to an enlarged surface area (best shown in FIG. 3E), which defines the final product size. Namely, the width of the relief gap is substantially the same as the thickness of the extruded final product. Preferably, the enlarged relief section extends completely to the outlet side of the die head 108. This is a significant factor in providing great structural strength of the die head 108. As a result, the die head is particularly well-suited for the production of extruded articles having substantial long lengths.

The relief surface 127 in the die allows for the pressure of the process to be maintained upstream of the die head 108 and prevents the upstream pressure from being applied downstream past the relief surface 127 of the die head. The relief surface 127 serves as a buffer against downstream pressure, thereby reducing the excessive pressure that can fracture the die assembly. Thus, the relief surface 127 in the die enables the use of long cooling tubes 156 in the cooling chamber 150 to allow the process to produce a high volume output. The configuration of the relief surface can also mitigate the occurrence of die swell of the material after exiting the die.

Without the relief surface 127 in the die, the pressure applied upstream of the die head would also be applied to the cooling tubes. However, the cooling tubes 156 have been designed to be long in length to assure a long residence time of the dense grain while advancing through the cooling tubes in order to substantially cool the product. If the upstream pressure is applied downstream to the long cooling tubes, then the process would require significantly more energy and pressure to push the product through the long cooling tubes. Without the relief in the die, such a configuration would not be practical in some conventional devices, and in some conventional applications would be impossible.

The die assembly is made of a robust material, because it is subjected to a great amount of pressure and extremely high forces. Therefore, the die must be designed with sufficient strength to withstand such pressure and force without cracking or failing. The die constructed according to the present teachings permits it to withstand the great pressures developed in forcing the material therethrough with the result that such die has greater die life than previous dies and require fewer repairs.

When using the die assembly 110 illustrated in FIGS. 1-3G, the die body 102 receives the dense hot grain from the bulk densification process (not shown) under pressure that is created by the continuous forward motion of the conveyance of material from the tip of the screws (not shown) through the bulk densifier adapter (not shown) to the die adapter 146 located at the second end 144. Then, through the use of lateral pressure, the densified material is pushed passed the nose cone member 126 which directs the flow of the grain to the die head 108 via a direct passageway 124 which flows from the bulk densifier (not shown) to the die head 108.

At the die head 108, the material is split and forced laterally through multiple orifices 122, which functions as an entrance of multiple passageways to the outlet of the die head. In certain embodiments, the orifices 122 are shaped, for example, like funnels such that the material enters the inlet of each orifice 122 evenly under pressure. As best shown in FIGS. 2A, 2B, and 3E, the passageway extending through the die head 108 is defined by orifices 122, funnel section 123, die tubing 125 and relief surface 127. Thus, the orifices 122, funnel section 123, die tubing 125 and relief surface 127 define flow paths for passage of the material from the die assembly downwardly in the direction of extrusion by pressure and force into the cooling chamber 150. In such embodiments, the largest area of the orifice 122 is located at the inlet (best shown in FIGS. 3B-3D). At the funnel section 123, the passage formed by the through-hole may taper inwardly from the inlet to a relatively small opening at the die tubing 125. Therefore, due to the funnel shape of the orifice 122, the material is compressed laterally and perpendicularly in a direction traverse to the direction of transport as the material advances forward. The internal structure of the die can be configured to produce a product that upon exiting the die the product is completely formed having the final desired shaped and the final desired high density. Thus, the die assembly may be configured such that flowing the grain material through the die head may generate sufficient lateral and perpendicular pressure on the grain material to produce the desired final density and shape of the product. After the material flows out of the relief of the die orifice 122 toward the cooling chamber, the material enters into the cooling tubes having its final shape and density. Therefore, upon completion of the die process, no additional steps such as applying additional pressure, or no additional additives are needed or required to achieve the desired high density or consistency.

Figure 9B:
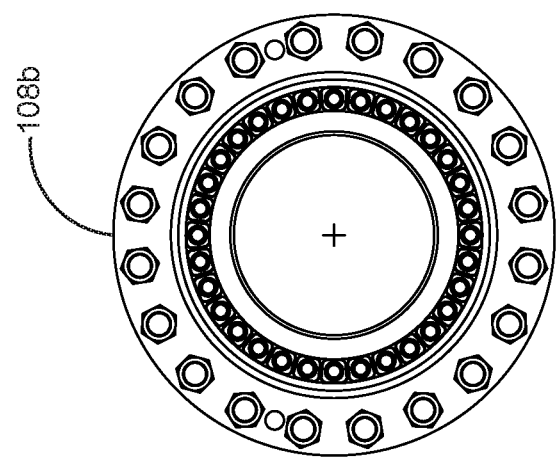
FIG. 9B illustrates an exemplary embodiment of a die head having a circular cross-section shape including 32 die tubes in accordance with the present teachings.
Figure 9A:
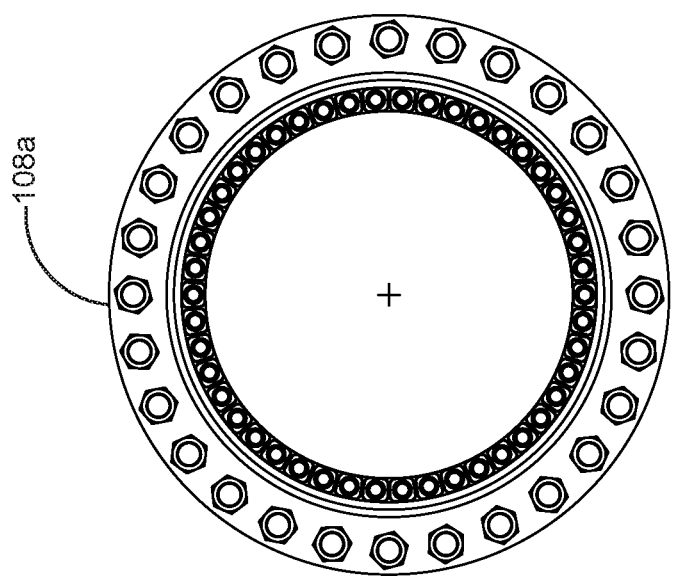
FIG. 9A illustrates an exemplary embodiment of a die head having a circular cross-section shape including 46 die tubes in accordance with the present teachings.
Figure 9D:
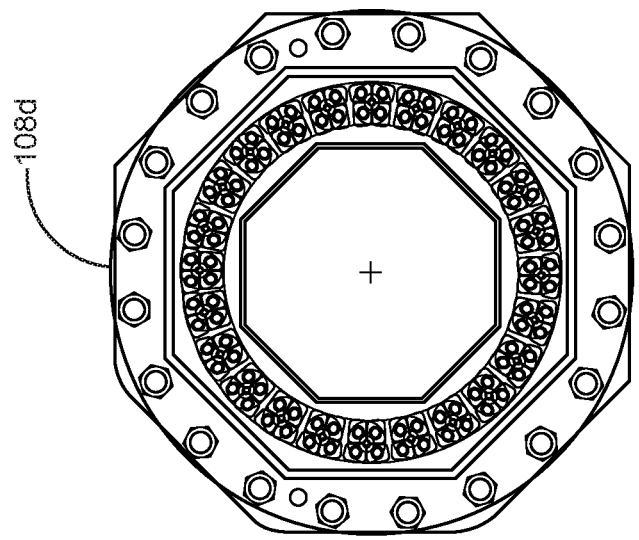
FIG. 9D illustrates an exemplary embodiment of a die head having an octagon shape including 98 die tubes or channels in accordance with the present teachings.
Figure 9C:
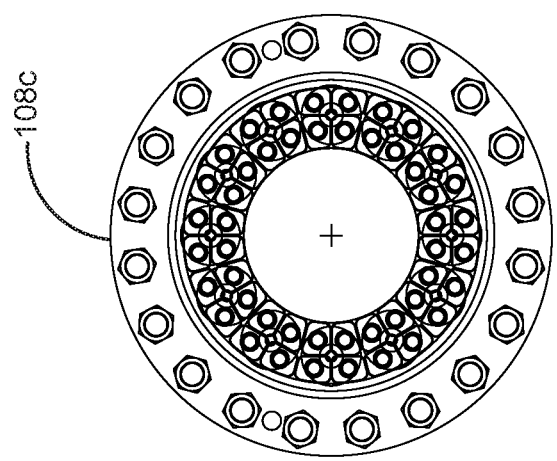
FIG. 9C illustrates an exemplary embodiment of a die head having a circular cross-section shape including 48 die tubes in accordance with the present teachings.

In various embodiments, the die head 108 can be product specific such that the configuration of the orifices 122 can be selected based upon the desired characteristics of the final product. FIGS. 9A-9D, similar to FIG. 3A, also depict various embodiments of the die head having an array of die tubing. FIG. 9A depicts a die head 108*a* having a circular cross-section shape including 46 die tubes. FIG. 9B illustrates a die head 108*b* having a circular cross-section shape including 32 die tubes. FIG. 9C depicts a die head 108*c* having a circular cross-section shape including 48 die tubes. FIG. 9D illustrates a die head 108*d* having an octagon shape including 98 die tubes or channels.

Mechanisms other than the funnel members 123 of the orifices 122 may be used to introduce the grain material into the die head 108. The funnel 123 may be of any particular shape other than conical or funnel-shaped, as long as the configuration compresses the material laterally and perpendicularly, such as, for example, triangular, pyramid, any configuration having inwardly sloping sides, etc.; the shape of the orifices 122 is exemplary and nonlimiting. Furthermore, the outflow end at the relief 127 of the funnel die tubing may be configured having a cross-sectional shape other than circular, such as, for example, square, rectangular, triangular, oval, etc. Those skilled in the art would recognize a variety of techniques and devices that may be used to introduce the grain material into the die head 108 and the cooling chamber 150.

Figure 4A:
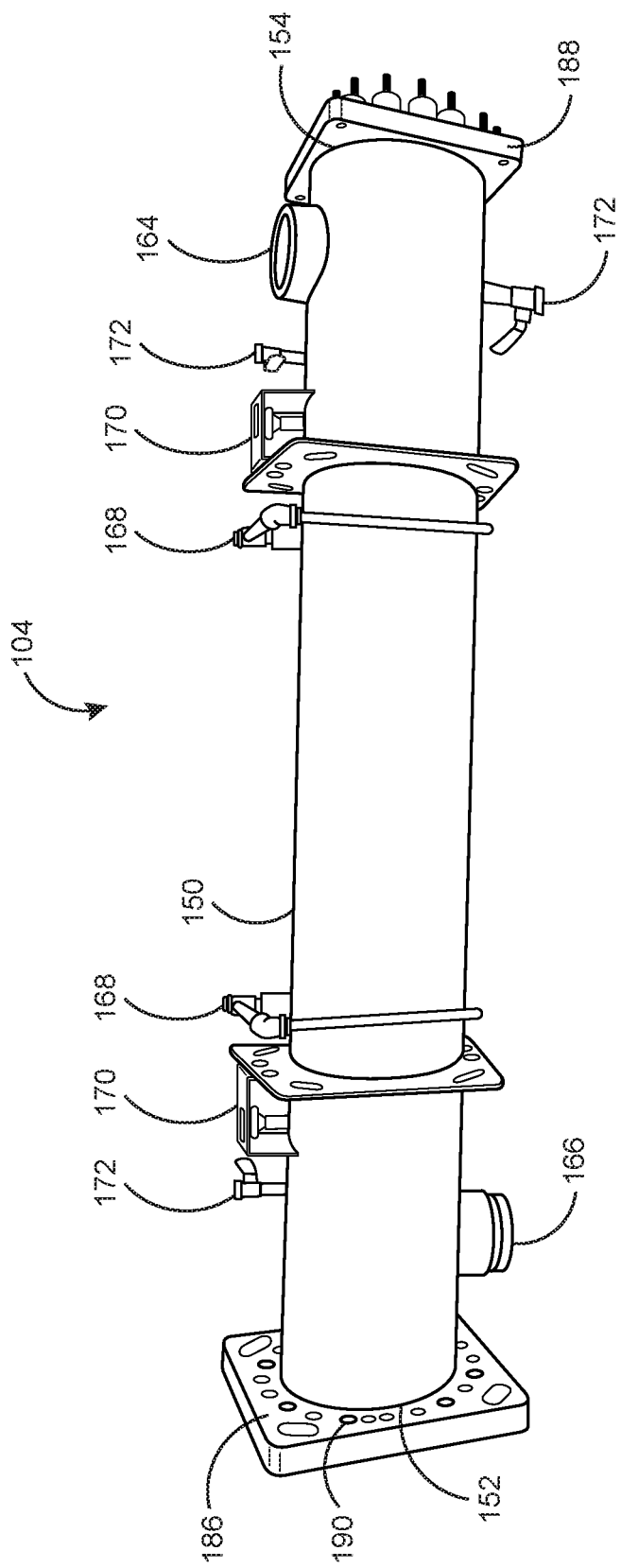
FIG. 4A illustrates a side perspective view of an exemplary embodiment of the cooling assembly of FIG. 1 shown in an opposite direction in accordance with the present teachings.

FIG. 4A is a side perspective view of an exemplary embodiment of the cooling assembly 104 of FIG. 1 shown in an opposite direction. When using the cooling assembly 104, the apparatus 100 advances the densified grain in the form of a hot, dense, stable product from the die head 108 to the cooling assembly 104 for cooling the product. The cooling assembly 104 can be mounted in a face-to-face engagement with the second plate part of the die head 114, as illustrated in FIGS. 1, 2B and 2C.

Figure 5:
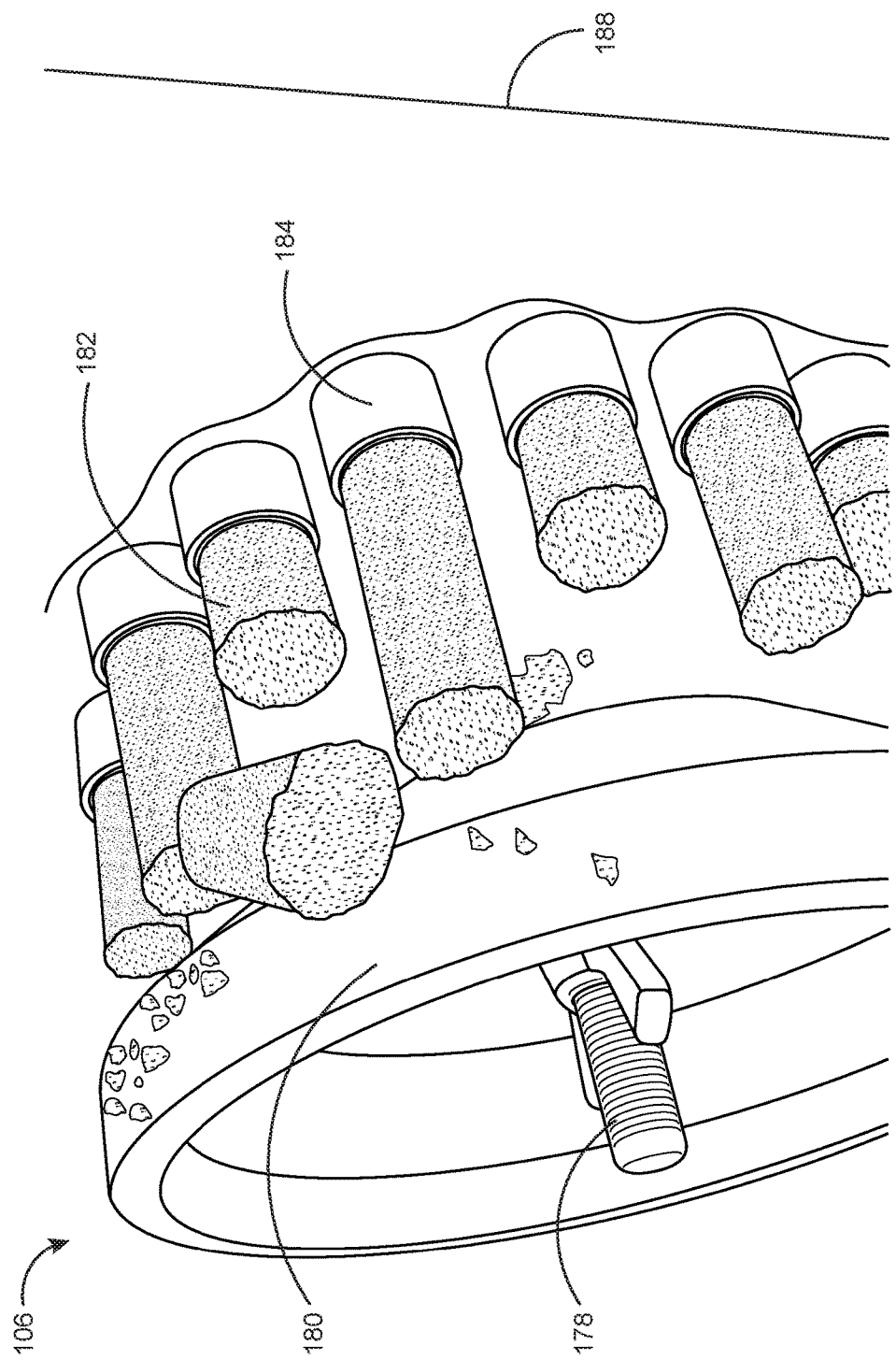
FIG. 5 illustrates a perspective view of an exemplary embodiment of a break-off assembly embodied with the grain processing apparatus shown in FIG. 1 in accordance with the present teachings.

The cooling assembly 104 may include a cooling chamber 150 having a first end 152, a second end 154, at least one cooling tube 156, an outlet end 160, a coolant passage 162, a first coolant opening 164 and a second coolant opening 166. The first end 152 may include a first plate member 186 (FIGS. 2, 4A and 4B) with a plurality of fourth set of holes 190 (FIG. 4A). The second end 154 may include a second plate member 188 (FIG. 4A) with a plurality of exit ports 184 (FIG. 5). The at least one cooling tube 156 may include an inlet end 158 connected to the at least one connector 192 (FIG. 4B) as a passageway to the outlet end 160. The outlet end 160 can be connected to at least one exit port 184 (FIG. 5). A break-off assembly 106 (FIG. 1) may be attached to the second plate member 188 at the second end 154 of the cooling chamber 150 (FIGS. 1, 4A, and 5).

FIG. 4B is a perspective view of the second plate member 186 as shown in FIG. 4A. The second plate member 186 includes a first portion 128 having the plurality of second set of holes 190. As illustrated in FIG. 2C, the first plate member 186 of the cooling chamber 150 is in face to face engagement with the die plate 108 in such a way that they are aligned to each other and connected through the plurality of fourth set of holes 190 with the at least one fastening means, when assembled. The plurality of connectors 192 extend outwardly for connecting the passageway from the die head 108 with the cooling tubes 156. One end of the plurality of connectors 192 mates with relief sections 127 of the die head 108, and the other end of the plurality of connectors 192 mates with the cooling tubes 156. Namely, the plurality of connectors 192 are configured to connect the die assembly 102 in fluid communication with the cooling chamber 150.

In some embodiments, the cooling chamber may be manufactured from carbon steel including pressure rated individual cooling tubes made of stainless steel. In some embodiments, the cooling section may be 18 feet long and include 8 die tubes, each having a ⅞-inch diameter. In some embodiments, the cooling section may be 20 feet long and include 20 die tubes, each having a ⅞-inch diameter. In some embodiments, the cooling section may be 6½ feet long and include 48 die tubes, each having a 7/16-inch diameter. All of the above embodiments are exemplary and non-limiting.

Various embodiments of the cooling assembly 104 may further include some or all of the following additional components: a temperature gauge 170 for measuring surface temperature in the cooling chamber 150, at least one valve drain 172 and at least one pressure relief valve 168 configured to regulate the amount of moisture added to the cooling chamber 150. A coolant (not shown) can be supplied to the coolant passage 162 (See FIG. 1) inside the cooling chamber 150 through the at least one coolant opening 164, 166 in order to remove heat from the densified grain. In various embodiments, the coolant opening 164, 166 can function as either an inlet or an outlet depending upon the configuration and application of the apparatus 100. The coolant (not shown) can be, for example, water, water mixed with glycol, oil, refrigerants gas or gases and/or any cooling medium.

The coolant passage 162 (See FIG. 1) maintains a low coolant temperature inside the cooling chamber 150 thereby removing a substantial amount of heat from the at least one cooling tube 156 during the process. In various embodiments, the at least one cooling tube 156 can include heat sink fins attached thereto to maximize cooling rates and efficiencies. Various embodiments of the cooling chamber may include a temperature gage 170 for measuring surface temperature in the cooling chamber 150, at least one valve drain 172 and at least one pressure relief valve 168 adapted to regulate the amount of moisture added to the cooling chamber 150. In some embodiments, the coolant (not shown) can be pumped through the coolant passage 162 in a re-circulatory manner with a pump or series of pumps (not shown). The coolant passage 162 inside the cooling chamber 150 can be managed by a central chilling system (not shown) to maintain a low coolant temperature thereby a substantial amount of heat is removed from the at least one cooling tube 156.

FIG. 5 is a perspective view of the break-off assembly 106 embodied within the grain processing apparatus 100 shown in FIG. 1 in accordance with the present teachings. The break-off assembly 106 can be attached to the second plate member 188 at the second end of the cooling chamber 154 (See FIG. 5). The break-off assembly 106 can include at least one cone breaker 180 threaded to at least one stud member 178. The at least one cone breaker 180 can be configured having a conical funnel shape. The at least one cone breaker 180 can be adjustable to twist or rotate in a clockwise or a counterclockwise direction and to move outward or away from the plurality of exit ports 184 of the cooling chamber 150 (See FIG. 5).

At the completion of the cooling process, the densified and shaped grain material 182 may emerge from the grain processing apparatus 100 through the plurality of exit ports 184. When exiting the plurality of exit ports 184 as shown in FIG. 5, the grain material 182 encounters the at least one cone breaker 180, which breaks off a portion of the grain material 182 thereby producing a final product of a predetermined length, shape, size having a high density. The position of the at least one cone breaker 180 may be adjusted longitudinally to adjust the break-off length of the exiting grain material 182.

Figure 6:
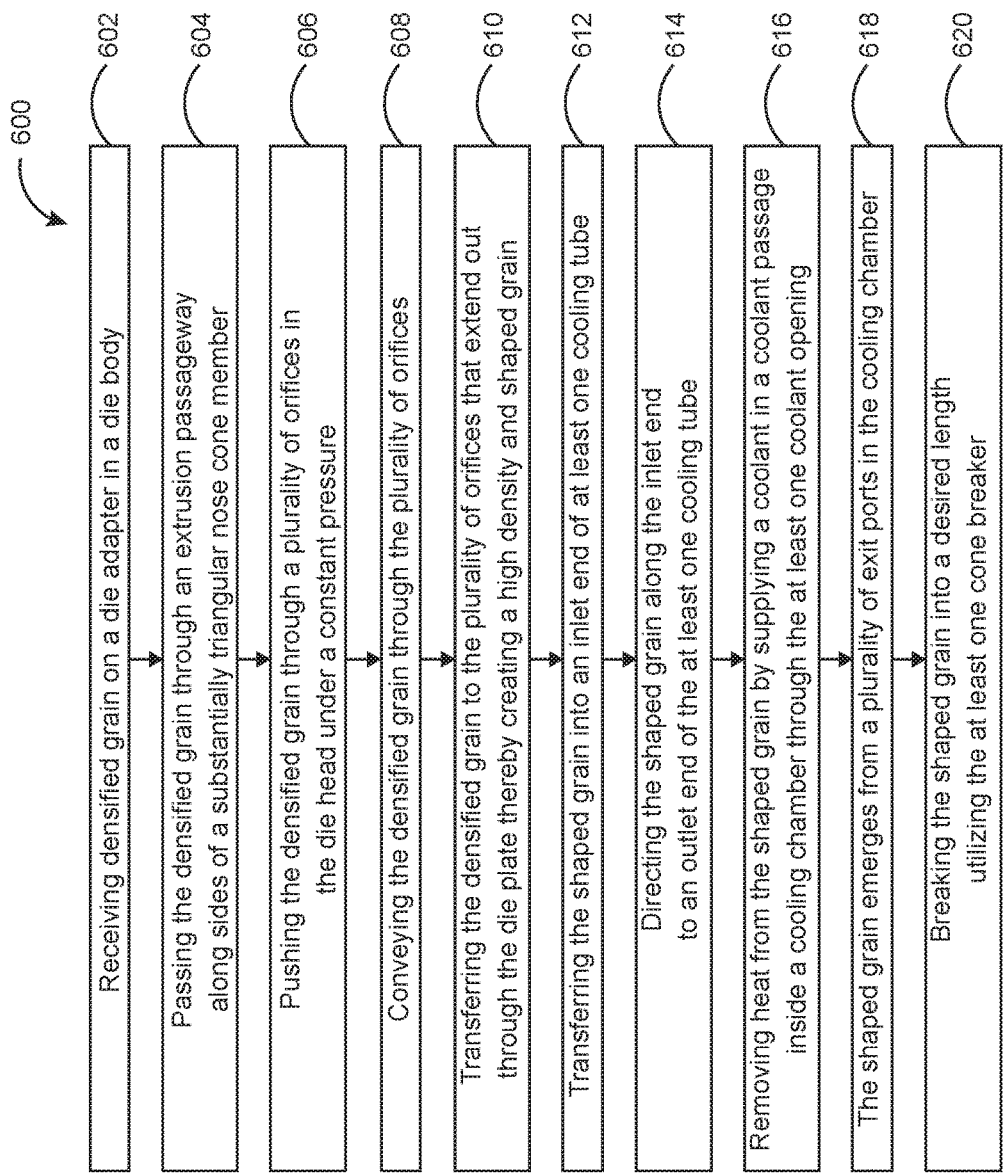
FIG. 6 is a flow chart illustrating an exemplary method for processing densified grain for generating a highly densified grain material having a desired length, shape and size.

FIG. 6 is a flow chart illustrating an exemplary method 600 for processing densified grain and for producing a highly densified grain material having a desired length, shape and size. In step 602, the densified grain feeds into the die adapter 146 at the second end of the die body 110. In step 604, the densified grain is passed through the extrusion passageway 124 along the sides of the substantially triangular nose cone member 126. Then in step 606, the densified grain is pushed to the plurality of orifices 122 of the die head 108 under a constant pressure.

After the grain pushing process, the densified grain is conveyed through the plurality of orifices 122 in step 608. In step 610, the densified grain is transferred to the plurality of orifices 122 that extend out through the die head towards the second portion of the second plate part 114 thereby producing a high density shaped grain. In step 612, the shaped grain is transferred to the inlet end 158 of the at least one cooling tube 156 of the cooling chamber. Each inlet end 158 connects to an outlet of the at least one orifice 122 of the die head. In step 614, the shaped grain is directed along the inlet end 158 to the outlet end 160 of the at least one cooling tube 156. During this transportation in step 616, the heat present in the shaped grain can be removed by supplying the coolant in the coolant passage 162 inside the cooling chamber 150 through the at least one first and second coolant opening.

Then, the shaped grain 182 exits at the outlet end 160 of the at least one cooling tube. Thereafter, the shaped grain 182 emerges from the plurality of exit ports 184 of the second plate member in the cooling chamber in step 618. Finally, the shaped grain 182 is broken off into the desired length utilizing the at least one cone breaker 180 in step 620. The final product of the grains will be produced having sufficient density for effective transportation, handling and storage practices.

Figure 7:
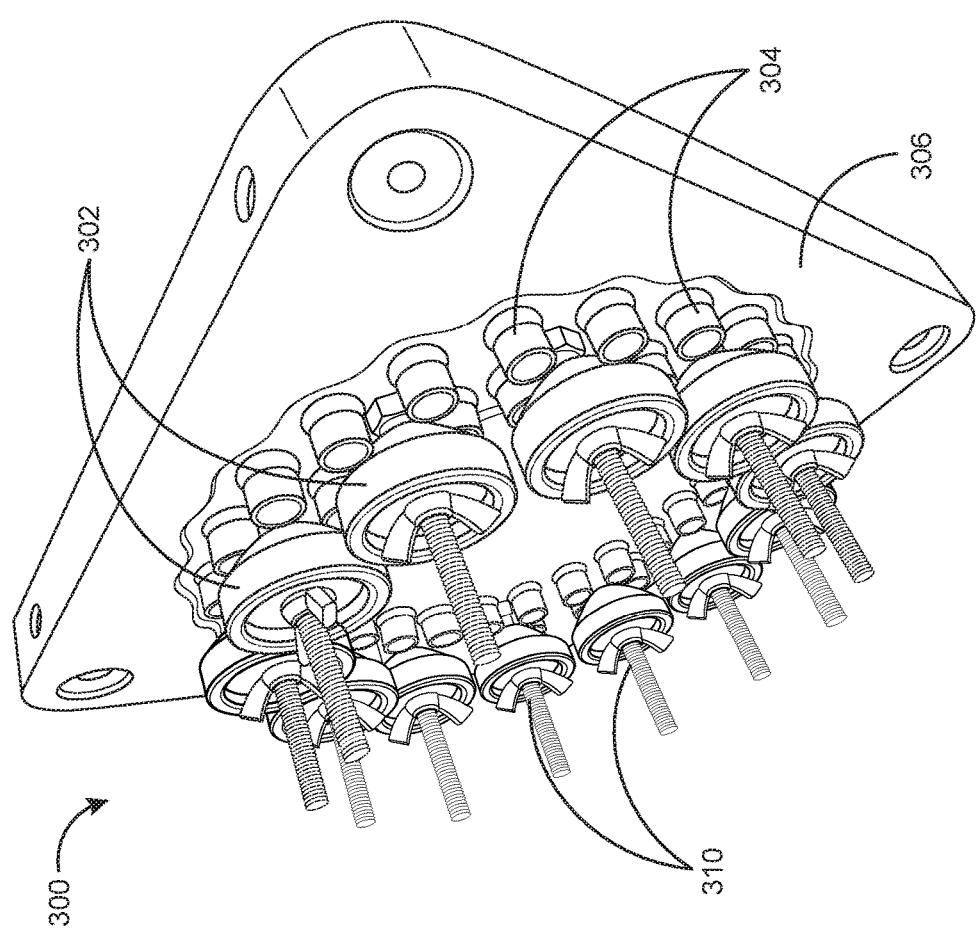

FIG. 7 illustrates another exemplary embodiment of the break-off assembly 106 shown in FIG. 5. In lieu of a single breaker 180, in some embodiments, the break-off assembly 300 may include a plurality of cone breakers 302 attached to the second plate 306 having a plurality of exit openings 304 for the densified grain product. The plurality of cone breakers 302 can be threaded to a plurality of stud adapter 310. This embodiment of the break-off assembly 300 including a plurality of cone breakers 302 allows the process to increase the productivity and produce a greater quantity of densified grain product within less time.

Figure 8:
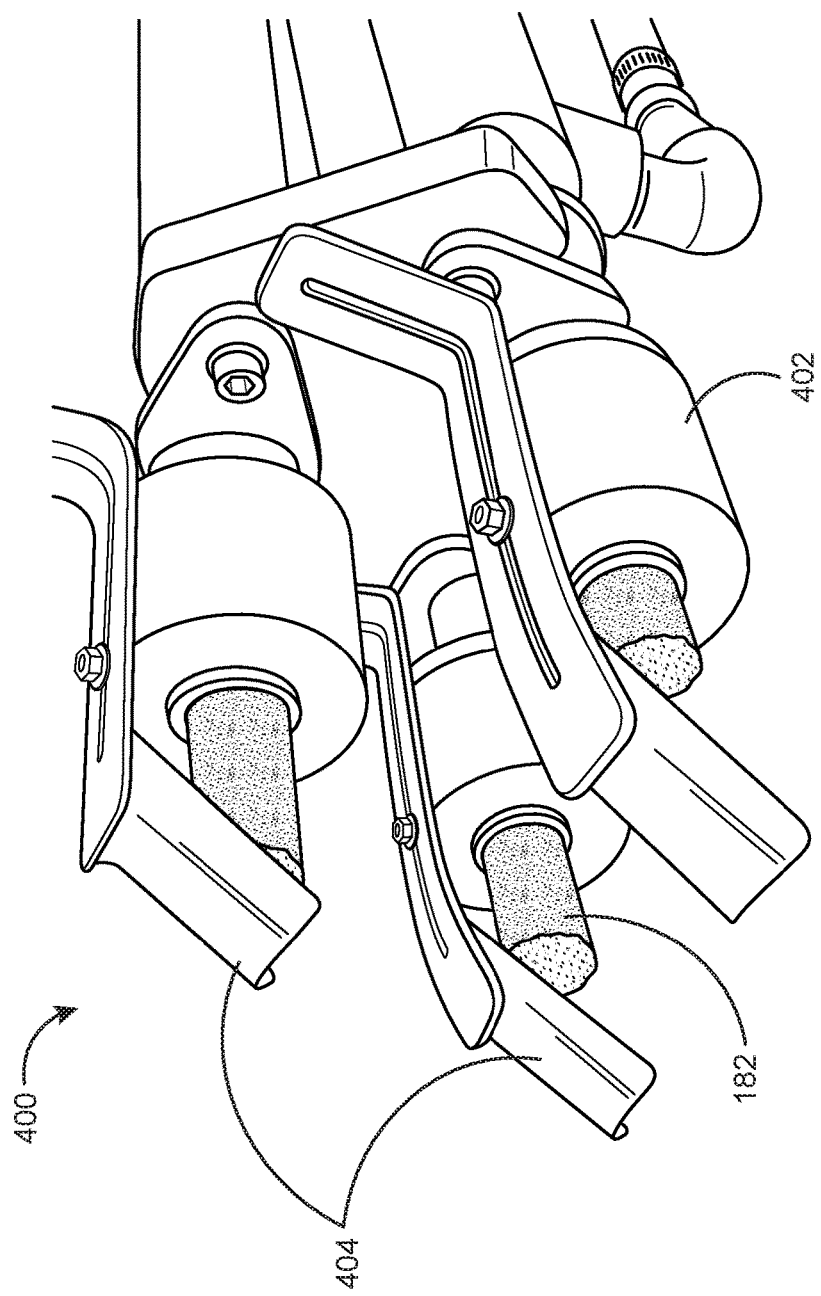
FIG. 8 illustrates yet another exemplary embodiment of the break-off assembly shown in FIG. 5 in accordance with the present teachings.

FIG. 8 illustrates yet another embodiment of the break-off assembly 106 shown in FIG. 5. In FIG. 8, the exemplary break-off assembly 400 includes a breaking mechanism 404 configured to provide a linear length of sliding movement for the densified grain, thereby efficiently adjusting the length of the densified grain product. The densified grain product exits from a plurality of tubes 402 which is adaptable to adjust the length of the densified grain product. Similar to the embodiments shown in FIG. 7, the break-off assembly 300, 400 effectively increases the productivity of the process and produces densified grain product having a desired length, shape and size.

By way of example only, the break-off assemblies 180 and 300 are depicted as having a conical shape. However, the break-off assemblies 180 and 300 may be of any particular shape other than conical or funnel-shaped, as long as the configuration breaks off the exiting final grain product, such as, for example, triangular, pyramid, any configuration having inwardly sloping sides, etc. Thus, the shape of the break-off assemblies 180 and 300 is exemplary and nonlimiting.

In an embodiment comprising a plurality of break-off assemblies 300, multiple cooling tubes having multiple break-off assemblies 300 may be utilized to emit several continuous stream of densified grain product and break off the densified grain product having the desired length, shape, and size. In such an embodiment, some or all of the break-off assemblies 300 may have similar or different shaped configurations. In some embodiments, two or more of the cone breakers and the breaking mechanisms can be adjusted to produce grain having the same length. In other embodiments, some of the cone breakers and the breaking mechanisms can be individually adjusted to produce grain having different lengths. The adjustment of the breaker 180, the plurality of breakers 302, and the breaking mechanisms 404 can be performed individually or collectively through either manual or automatically controlled means.

In lieu of the triangular nose cone member 126 being centrally located, in some embodiments the triangular nose cone member may be positioned at a location offset from the center of the die. As shown in the example of FIG. 11, the offset configuration may be configured to enable different amounts of grain to flow through specific orifices to produce grain products having specific characteristics, such as smaller diameters 122a or larger diameters 122b, or different consistency. In some embodiment, the triangular nose cone may be configured such that the offset position is stationary. In other embodiments, the triangular nose cone may be rotated and locked in various positions to partially or completely block the inlet of the orifices to control the amount of grain inserted into specific orifices. This arrangement may enable selective use of one or more of specific orifices. Furthermore, in lieu of the uniform rectangular orifices depicted in FIGS. 3A and 3B in some embodiments, the orifices may have various sizes, as shown in FIG. 11, or various cross-sectional shapes configurations, such as, without limitations, circular, semi-circular (one-half of a circle), elliptical, oval, or polygonal cross-sections.

In general, according to various embodiments, the densified grain processing 100 apparatus enables the formation of highly densified grain material having a desired length, shape and size with greater ease and economy. The extrusion passageway 124 encloses the substantially triangular nose cone member 126 which is, centrally located, inwardly extending and acts as a flow-directing mechanism inside the die body 110. The die head 108 and the die adapter 146 can be made, for example, of 4140PH and plated with an electroless nickel with Teflon impregnation along with a hardness bake. In some embodiments, the die head 108 and the die body 110 can be removably coupled to each other.

The die head 108 of the die assembly 102 may include a plurality of orifices 122. Each orifice 122 may have an enlarged area at the inlet of the orifice and a narrowed area at the outlet of the orifice such that each orifice forms a funnel shape configuration. The funnel shape of the orifice compresses the densified grain laterally and perpendicularly according to the forward motion of the densified grain as it advances forward along the die head 108 towards the second plate part 114.

The grain processing apparatus 100 provides the desired removal of heat content from the at least one cooling tube 156 by maintaining a low coolant temperature inside the cooling chamber 150 during the process. Various embodiments provide a grain processing apparatus and method for processing densified grain into higher densities without necessarily supplying any extra pressure. The grain processing apparatus 100 provides the desired features of reduced cost of energy and operation, as well as reduced maintenance, while maintaining a high output of grain product from the apparatus 100.

It will be apparent to those skilled in the art that various modifications and variations can be made to the device and method of the present disclosure without departing from the scope of its teaching. By way of example, the design of the various components of the apparatus, such as the die assembly, cooling, and the break-off assembly, can be configured based on the rheological characteristics of a specific material. The rheological data can be used to determine the flow and deformation properties of a specific material under applied pressure as the material flows through the device. Some examples of rheological characteristics that may be considered in the system design are: temperature, pressure, flow rate, mechanical properties, flow properties, and viscosity.

CONCLUSION

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications and combinations are included herein by the scope of this disclosure and the following claims.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An apparatus for producing a densified grain comprising:
    a die assembly, the die assembly comprising:
        a die body having a first annular end, a second end having a die adapter for receiving a grain material, and a substantially triangular nose cone member at a middle portion thereof, wherein the grain material received by the die adapter is forced through an extrusion passageway that evenly distributes the grain material into each of a plurality of orifices thereby producing a high density grain material;
        a die head comprising at least one plate including the plurality of orifices, each orifice extending out through the die head such that each orifice defines a plurality of die passageways within the die head for the grain material to pass there through, the die head being mounted to the die body with at least one first fastening mechanisms thereby enclosing the substantially triangular nose cone configured as a flow-direction mechanism to provide the extrusion passageway for the grain material, wherein the grain material received by the die adapter is forced through the extrusion passageway that evenly distributes the grain material into each of the orifices thereby forming the grain material into a shaped grain material having a predetermined density before the grain material exits the die head;
            each die passageway comprises:
                an inlet surface that tapers downwardly;
                a plurality of funnel-shaped structures extending from the inlet surface, each funnel-shaped structure having a wide inlet and inwardly sloping sides extending downwardly;
                a constricted passage extending from the inwardly sloping sides of each funnel-shaped structure, the constructed passage having a constricted diameter that is smaller than a diameter of a final product, wherein the constricted passage is configured having a linear length sufficient to enable the grain material to stabilize to the constricted diameter as the grain material travels therein; and
                a relief section downstream of the constricted passage, wherein the relief section having an enlarged diameter that defines the diameter of the final product, and the relief section extends to an outlet of the die head;
    a cooling assembly for cooling the shaped grain material, the cooling assembly comprising:
        a cooling chamber having a first end, a second end, a first coolant opening, a second coolant opening and a coolant passage that extends from the first end to the second end, the first and the second coolant openings configured to receive at least one coolant to the coolant passage, the cooling chamber comprising:
            a first plate member positioned at the first end, the first plate member being mounted to the die head with at least one second fastening mechanisms;
            a second plate member having a plurality of exit ports positioned at the second end;
            at least one cooling tube having an inlet end for receiving the shaped grain material and an outlet end, the at least one cooling tube being horizontally placed inside the cooling chamber, and the inlet end of the at least one cooling tube is connected to at least one of the plurality of the die passageways of the die head, the outlet end of the at least one cooling tube is connected to at least one of the plurality of the exit ports of the second plate member of the cooling chamber, the cooling chamber cools the shaped grain material by passing the shaped grain material through the at least one cooling tube;
    a break-off assembly for breaking off a preselected length of the shaped grain material, the break-off assembly comprising:
        at least one stud member attached to the second plate member at the second end of the cooling chamber; and
        at least one cone breaker being threaded to the at least one stud member.

2. The apparatus of claim 1 wherein the at least one cone breaker includes a conical funnel shape.

3. The apparatus of claim 1 wherein the at least one cone breaker is adjustable relative to the plurality of exit ports of the cooling chamber.

4. The apparatus of claim 1 wherein the at least one cone breaker is adjustable by twisting or rotating the at least one cone breaker in a clockwise or counterclockwise direction to move the cone outwards or away from the plurality of exit ports of the cooling chamber.

* * * * *